United States Patent [19]

Bouchard et al.

[11] Patent Number: 4,575,344
[45] Date of Patent: Mar. 11, 1986

[54] METAL ARC DIRECTOR FOR COMPACT FLUORESCENT LAMP

[75] Inventors: Andre C. Bouchard, Peabody; Jakob Maya, Brookline; Fred Loughridge, Ipswich; Charles W. Andress, Danvers; Julian Wierzbicki, Peabody, all of Mass.

[73] Assignee: GTE Products Corporation, Stamford, Conn.

[21] Appl. No.: 698,215

[22] Filed: Feb. 4, 1985

Related U.S. Application Data

[62] Division of Ser. No. 481,204, Apr. 1, 1983, Pat. No. 4,527,088.

[51] Int. Cl.[4] .............................................. H01J 9/00
[52] U.S. Cl. ........................................ 445/26; 445/40
[58] Field of Search ..................... 445/26, 35, 38, 40; 313/609, 610, 611, 612, 493, 634

[56] References Cited

U.S. PATENT DOCUMENTS

| | | | |
|---|---|---|---|
| 4,199,708 | 4/1980 | Lauwerijssen | 313/612 |
| 4,208,604 | 6/1980 | Couwenberg | 313/493 |
| 4,208,618 | 6/1980 | Heine | 313/493 |
| 4,508,993 | 4/1985 | Anderson | 313/493 |

FOREIGN PATENT DOCUMENTS

| | | | |
|---|---|---|---|
| 0044958 | 3/1982 | Japan | 313/493 |
| 0061253 | 4/1982 | Japan | 313/634 |
| 0078749 | 5/1982 | Japan | 445/26 |
| 0003840 | 1/1984 | Japan | 445/26 |

Primary Examiner—Kenneth J. Ramsey
Assistant Examiner—Kurt Rowan
Attorney, Agent, or Firm—Carlo S. Bessone; William H. McNeill

[57] ABSTRACT

Compact fluorescent lamps employ metal arc directors formed from suitable material, such as steel. The steel parts are vacuum fired to degas same prior to assembly in the lamps.

3 Claims, 6 Drawing Figures

METAL ARC DIRECTOR FOR COMPACT FLUORESCENT LAMP

This is a divisional of co-pending application Ser. No. 481,204 filed on Apr. 1, 1983 now U.S. Pat. No. 4527088.

TECHNICAL FIELD

This invention relates to fluorescent lamps and more particularly to compact versions of such lamps having utility as replacements for incandescent lamps. Still more particularly the invention relates to metal arc directors for such lamps.

BACKGROUND ART

The fluorescent lamp is the most widely utilized light source in the world for general illumination, primarily because of its relatively low initial cost and its efficacy: i.e., its light output relative to its power input, usually expressed as lumens per watt (LPW). Nevertheless, for home use, the fluorescent lamp has not taken precedence over the incandescent lamp. Many reasons have been advanced for this lack of acceptance, among them the poor color rendition of some fluorescent lamps and their need for a ballast. However, one of the major disadvantages lies in the fact that a fluorescent lamp is a linear light source whereas an incandescent lamp can almost be considered a point source. The typical fluorescent lamp has a length of from 18" to 8' and is somewhat cumbersome to work with.

With the increasing cost of energy, attempts have been made to overcome the latter difficulty. One of these attempts has utilized a plurality of fluorescent tubes having one or more smaller tubes connecting the ends of the fluorescent tubes to provide an arc path. Such lamps are shown in U.S. Pat. No. 3,501,662. Large, "U" shaped lamps such as those shown in U.S. Pat. Nos. 3,602,755; and 2,401,228; and triple bend lamps such as shown in U.S. Pat. No. 4,347,460 exemplify other attempts.

Still other attempts are shown in U.S. Pat. Nos. 4,208,618; 4,191,907; and Ser. No. 431,955, filed Sept. 30, 1982 and assigned to the assignee of the instant invention.

While each of these proposals has its own advantages, disadvantages also exist. The previous forms of multiple tubing lamps are expensive to produce and difficult to handle during manufacture.

Many types require expensive, custom made partitions and/or require large numbers of hermetic seals. Multiple bend tubes require large outlays for manufacturing equipment which adds to the cost of the final lamp.

Yet another type of compact light source is exemplified by a fluorescent lamp comprising a hermetically sealed outer envelope containing an arc generating and sustaining medium. Positioned within this outer envelope is an assembly comprised of a plurality of elongated glass tubes coated on their interior surface with a phosphor. All of the interior surfaces are open to the medium. The tubes have first and second ends and the assembly has first and second arc directing means operatively associated with the first and second ends of the tubes to provide a continuous arc path therethrough. An electrode is positioned at both ends of the arc path and means are provided for making electrical connection to the electrodes.

In an alternate embodiment, the assembly comprises a pair of U shaped tubes each having an electroded end and an open end. An arc directing means is operatively associated with the ends of the tubes and includes an arc director which connects the open end of the tubes.

Compact fluorescent lamps built according to the above provide many improvements over the prior art. Custom-made partition structures are avoided as are multiple hermetic seals. Also, since either straight tubing or simple U shaped tubes are employed, complex machinery for making multiple bends is also obviated and lamps made in accordance with this invention are economical to fabricate.

The latter two lamps are disclosed in Ser. No. 481,230, filed concurrently herewith, now U.S. Pat. No. 4,527,089, July 2, 1985.

It would be an advance in the art to provide simple, economical and efficient arc directing means for use with compact fluorescent lamps.

DISCLOSURE OF THE INVENTION

It is, therefore, an object of the invention to obviate the disadvantages of the prior art.

It is another object of the invention to provide improved arc directing means for fluorescent lamps.

It is yet another object of the invention to provide a method for making such arc directing means.

These objects are accomplished, in one aspect of the invention, by arc directing means which comprise an electrically conductive base member having a plurality of apertures therein. Some of the apertures include means formed to receive electrodes and other of the apertures include means formed to receive the open, or un-electroded, ends of fluorescent tubes. An arc director is associated with the other apertures.

The arc directing means are fabricated by forming the base member from electrically conductive material and providing the apertures therein. The arc director is formed from electrically conductive material and is in the shape of, e.g., a rectangular dish. The base member and the arc director are degreased and vacuum fired at about 800° C. for about one hour to degas them. The arc director is then affixed to the base member to form the arc directing means. The last named means is then re-fired in a vacuum for about two hours at about 1000° C. for further degassing. The prepared part is subsequently employed in a fluorescent lamp.

Arc directing means as described above are simple to fabricate, economical, and efficient.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
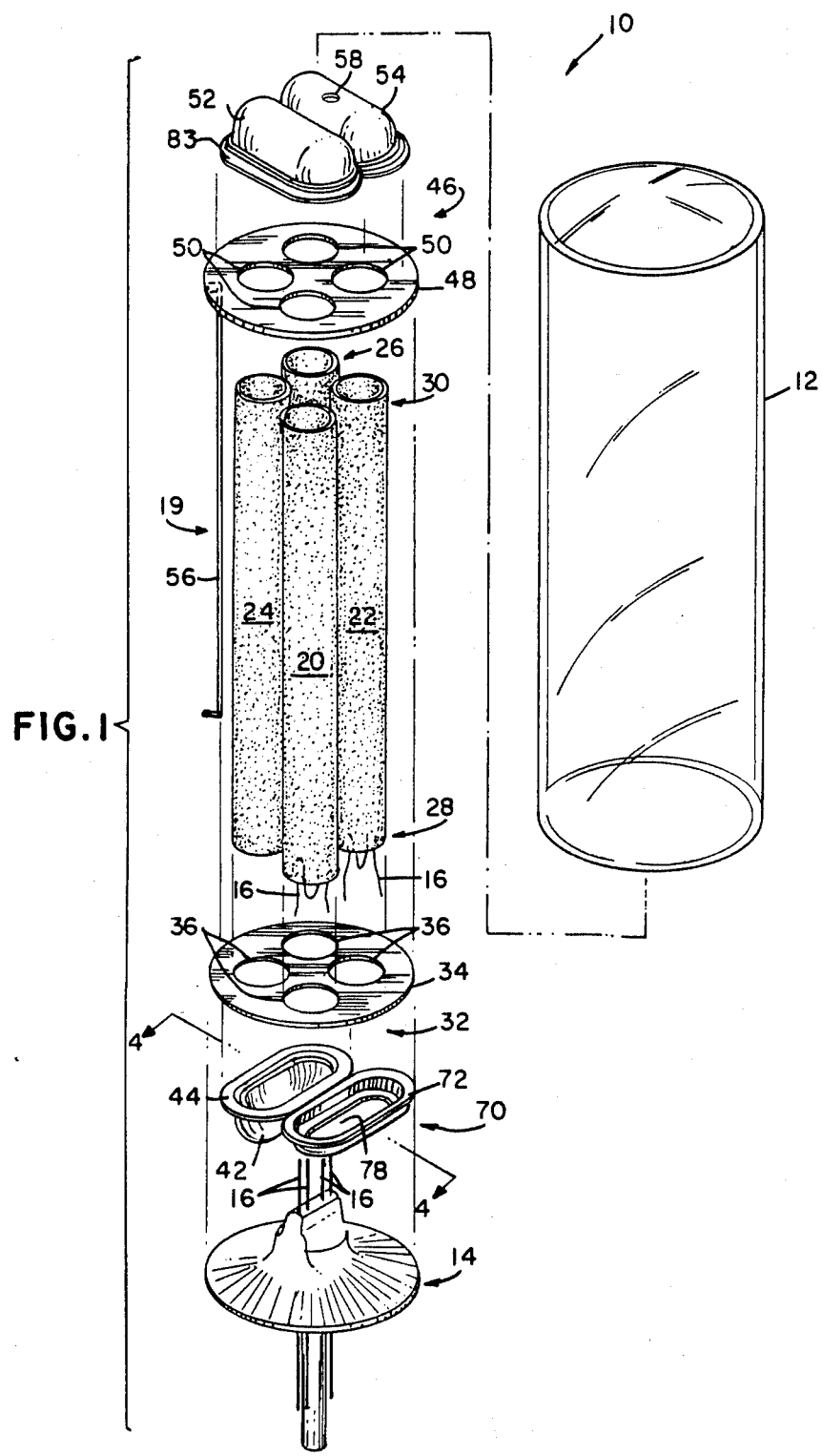
FIG. 1 is an exploded, perspective view of a lamp in which the invention can be employed.

Referring now to the drawings with greater particularity, there is shown in FIG. 1 a compact fluorescent lamp 10 having an outer, light-transmissive, glass envelope 12 which is hermetically sealed to a flare 14 which includes lead-in wires 16 and an exhaust tubulation 18. An arc generating and sustaining medium, e.g., about 20 mg of mercury and argon at a pressure of 3 torr, is provided within envelope 12.

Also positioned within envelope 12 is an assembly 19 comprised of a plurality of elongated tubes 20, 22, 24 and 26 each having first ends 28 and second ends 30. The tubes are coated on their interior surface with a suitable U.V. excitable phosphor, e.g., a calcium halophosphate activated by antimony and manganese, or any operative phosphor or combination of phosphors. The phospor can be applied by any suitable method, including those used to coat conventional fluorescent tubes.

In a preferred embodiment, the tubes 20, 22, 24 and 26 are formed from T5 tubing and are four inches (approx. 10.16 cm) long. For ease in coating, a single, long tube, say three feet long, can be coated and subsequently cut into appropriate lengths. The cut ends of the tubing should be lightly fire polished.

A first arc directing means 32 is associated with first ends 28 of tubes 20, 22, 24 and 26, and comprises a first base member 34 having apertures 36 therein for receiving the first ends 28 of the tubes.

Figure 2:
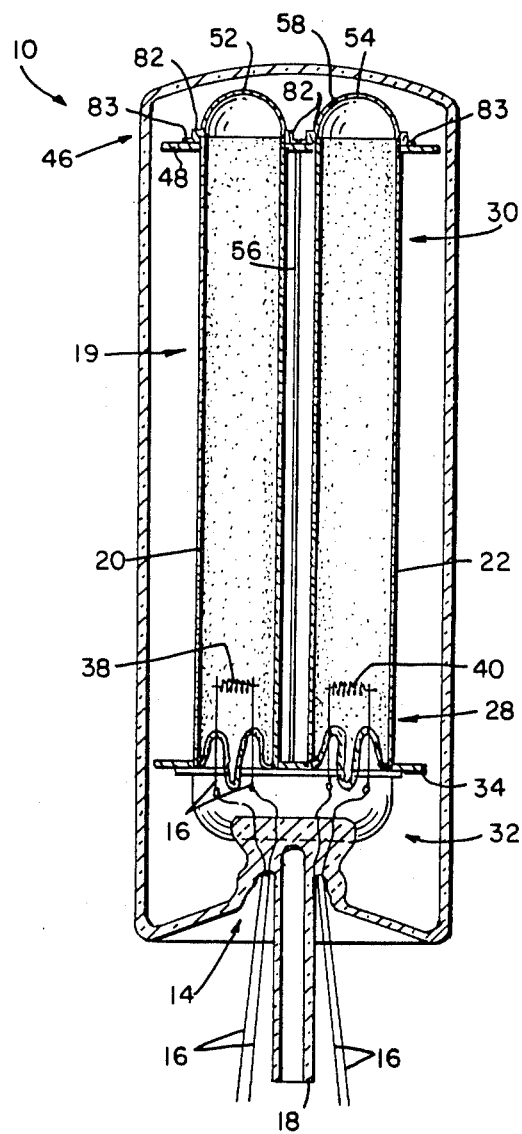
FIG. 2 is a sectional, elevational view of the embodiment of FIG. 1.

Two of the tubes, e.g., 20 and 22, have their first ends 28 provided with electrodes 38 and 40, respectively (see FIG. 2). While these electrodes may be sealed into the tube ends in a conventional manner for convenience in handling, it is not necessary that a hermetic seal be formed, and the electrodes may be mounted within the tubes in any desired manner.

A single arc director 42 is positioned on the underside of first base member 34 and covers the apertures into which the first ends 28 of tubes 24 and 26 are fitted. As shown, arc director 42 is in the form of a rectangular dish having a peripheral rim 44 about its open side. The arc director 42 is affixed to the underside by any suitable means, if it is formed separate from first base member 34, although the entire arc directing means 34 can be formed as a one piece unit.

A second arc directing means 46 is associated with the second ends 30 of tubes 20, 22, 24 and 26 and comprises a second base member 48 having apertures 50 therein for receiving the second ends 30 of the tubes.

The upper side of second base member 48, i.e., the side remote from the tubes, has two arc directors 52 and 54 positioned thereon. The arc directors 52 and 54 can be of the same construction as arc director 42. Arc director 52 encompasses the apertures receiving the second ends 30 of the tubes 20 and 24; and arc director 54 encompasses the apertures receiving the second ends 30 of the tubes 22 and 26.

A connecting rod 56 of, e.g., steel, extends between the first base member 34 and the second base member 48 and is affixed thereto, as by welding, thus securing the assembly 19 together as a unit.

The fit between the various ends of the tubes within the apertures of the base members is merely a mechanical one that is characterized as being arc tight but permeable to the arc generating and sustaining medium that is present within the hermetically sealed outer envelope 12. To aid in evacuating and to insure that the medium penetrates within the tubes, at least one of the arc directors, e.g., 54, is provided with an opening 58 therein.

Figure 3:
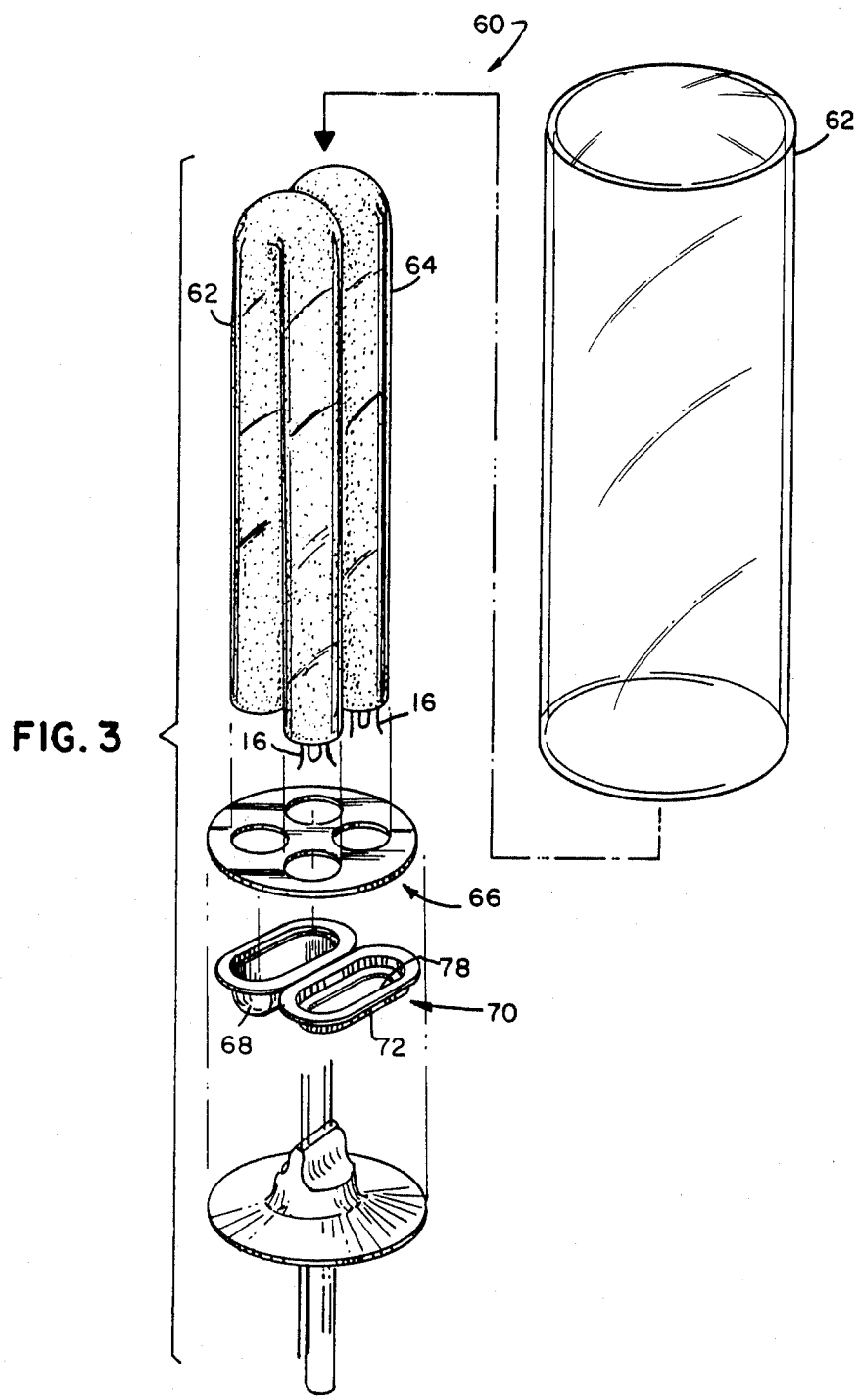
FIG. 3 is an exploded, perspective view of an alternate lamp in which the invention can be employed.

An alternate construction is shown in FIG. 3 wherein lamp 60 is substantially similar to lamp 10 except that two U shaped tubes 62, 64 are employed. In the latter embodiment, only one arc directing means 66 is necessary. Arc directing means 66 can be constructed similar to arc directing means 32. Lamp 60 has the additional advantage of providing light from the U bends. Electrodes are provided in adjacent ends of the U tubes and the arc director 68 connects the open, or un-electroded, ends.

Figure 4:
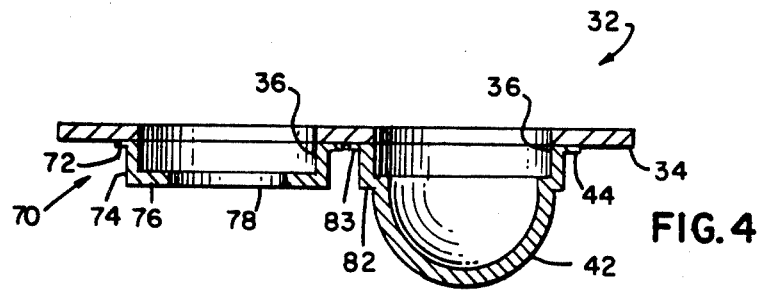
FIG. 4 is an enlarged, sectional view of an arc directing means taken along the line 4—4 of FIG. 1.

Referring now to FIG. 4, arc directing means 32 (or 66 of FIG. 3) has first base member 34 formed from relatively thick, rigid, electrically conductive material, e.g., cold rolled steel. The thickness is preferably about 0.024 inches and the diameter is sized to fit within outer envelope 12 or 62. Some of the apertures 36 therein include electrode receiving means 70. The electrode receiving means 70 comprises a peripheral rim 72 having an upstanding wall 74 with an inwardly projecting shoulder 76. The inner edge of shoulder 76 defines a rectangular opening 78 through which project the electrode lead-in wires 16 and exhaust tubulations 80, if they are provided (see FIG. 5). The shoulder 76 seats the first ends 28 of electroded tubes 20 and 20 as they are fitted within apertures 36. Attachment of receiving means 70 to base member 34 is by any suitable means, preferably, welding of the rim 72 to the base member 34.

Figure 5:
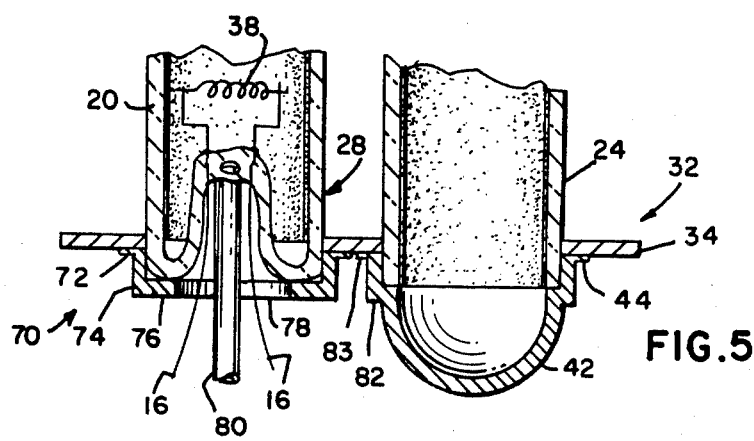
FIG. 5 is a view similar to FIG. 4 showing fluorescent tubes positioned with the arc directing means.

The arc directors 44, 52, 54 and 68 can also be provided with a shoulder 82, as is shown in detail in FIGS. 2, 4, and 5, and also are preferably attached to their respective base members by welding the rims 83 to the base members.

The receiving means 70 and the arc directors 44, 52, 54 and 68 are preferably made from material having a thickness less than one half that of the base members, a preferred material being SAE 1008 steel with a thickness of about 0.010 inches.

Figure 6:
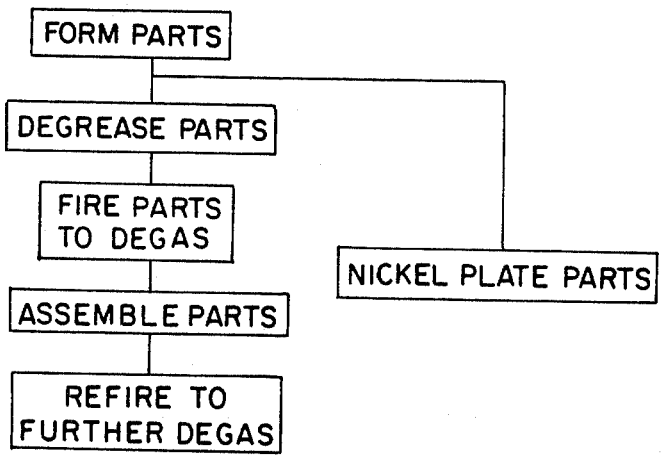
FIG. 6 is a flow diagram of the method of making the arc directors.

The method of making the arc directing means is shown diagrammatically in FIG. 6. The parts are formed in any suitable manner, e.g., the base members and their apertures can be formed by stamping, as can the arc directors. The latter can then be die drawn to the desired shape. The parts are then degreased, e.g., in a vapor degreaser, and are then degassed by vacuum firing for about one hour at about 800° C. After initial degassing the arc directors and electrode receiving means are attached to the base members, as by welding, and the assembled arc directing means are further degassed by a second firing in vacuum for about 2 hours at about 1000° C. In a preferred embodiment, all parts are nickel plated before firing and assembly.

The arc directing means are then ready to be employed in a compact fluorescent lamp.

In operation, the arc will proceed, during each half cycle, from electrode 38 up the length of tube 20, across arc director 52, down tube 24, across arc director 42, up tube 26, across arc director 54, and down tube 22 to electrode. On the following half cycle, of course, the direction will be reversed.

Lamps constructed as described above have many advantages over those of the prior art. Simple, mechanical joints are employed together with novel arc directors, to form a long arc path in a compact lamp. The lamps can be constructed with a range of tube quantities and tube lengths giving flexibility to the size and output of the lamps.

The lamps can be operated at high electrical loadings because the first arc directing means provide a heat shielding effect, thus allowing the mercury vapor pressure to be held at a lower temperature at the bottom of envelope 12.

The tubes can be constructed from a variety of materials since no seals are required internally.

Because each of the tubes is a separate entity, each of the tubes can have a different phosphor applied thereto, thus allowing for color blending.

Further, the lamps are adaptable to high speed manufacturing techniques because of the mechanical nature of the inner assembly.

While there has been shown what are at present considered to be the preferred embodiments of the invention, it will be apparent to those skilled in the art that various changes and modifications can be made herein without departing from the scope of the invention as defined by the appended claims.

We claim:

1. The method of making an arc directing means comprised of a base member and an arc director for a compact fluorescent lamp comprising the steps of: forming said base member of relatively thick, electrically conductive material with a plurality of apertures therein; forming at least one substantially rectangular, dish shaped arc director from relatively thin, electrically conductive material; degreasing said base member and said arc director; degassing said base member and said arc director by firing in a vacuum for about one hour at about 800° C.; affixing said arc director to said base member to form said arc directing means; firing said arc directing means in a vacuum for about two hours at about 1000° C. to further degas same; and subsequently employing said arc directing means in said fluorescent lamps.

2. The method of claim 1 wherein said base member and said arc director are formed from steel and said arc director has a thickness less than one half the thickness of said base member.

3. The method of claim 2 wherein said arc director is nickel plated prior to affixation to said base member.

* * * * *